United States Patent
Kubota et al.

(10) Patent No.: US 11,619,720 B2
(45) Date of Patent: Apr. 4, 2023

(54) DISTANCE MEASURING DEVICE, DISTANCE MEASURING METHOD, AND SIGNAL PROCESSING METHOD

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Hiroshi Kubota, Fussa (JP); Nobu Matsumoto, Ebina (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 789 days.

(21) Appl. No.: 16/567,707

(22) Filed: Sep. 11, 2019

(65) Prior Publication Data

US 2020/0292677 A1     Sep. 17, 2020

(30) Foreign Application Priority Data

Mar. 14, 2019   (JP) .............................. JP2019-047373

(51) Int. Cl.
| | |
|---|---|
| *G01S 7/48* | (2006.01) |
| *G01S 7/4865* | (2020.01) |
| *G01S 7/481* | (2006.01) |
| *G01S 7/484* | (2006.01) |
| *G01S 7/4861* | (2020.01) |

(Continued)

(52) U.S. Cl.
CPC ............ *G01S 7/4865* (2013.01); *G01S 7/484* (2013.01); *G01S 7/487* (2013.01); *G01S 7/4817* (2013.01); *G01S 7/4861* (2013.01); *G01S 17/10* (2013.01)

(58) Field of Classification Search
CPC ...... G01S 7/4817; G01S 7/484; G01S 7/4861; G01S 7/4865; G01S 7/487; G01S 17/10
See application file for complete search history.

(56) References Cited

U.S. PATENT DOCUMENTS

| | | | |
|---|---|---|---|
| 6,819,407 B2 | 11/2004 | Arita et al. | |
| 8,831,908 B2 | 9/2014 | Kamitani et al. | |

(Continued)

FOREIGN PATENT DOCUMENTS

| | | |
|---|---|---|
| JP | 2001-242242 A | 9/2001 |
| JP | 3838432 B2 | 10/2006 |

(Continued)

*Primary Examiner* — Kevin K Pyo
(74) *Attorney, Agent, or Firm* — Oblon, McClelland, Maier & Neustadt, L.L.P.

(57) ABSTRACT

According to an embodiment, a distance measuring device is a signal processing device that performs processing on time-series luminance signals of each of frames acquired on the basis of reflected lights of laser lights irradiated in order in a plurality of predetermined directions for each of the frames. The distance measuring device includes a storage circuit and a selection circuit. The storage circuit stores information concerning a distance value obtained on the basis of a time-series luminance signal of a preceding frame. The selection circuit selects a peak based on the distance value as a candidate of the distance value out of peaks in the time-series luminance signal in a present frame.

20 Claims, 9 Drawing Sheets

(51) Int. Cl.
    *G01S 7/487*  (2006.01)
    *G01S 17/10*  (2020.01)

(56) References Cited

U.S. PATENT DOCUMENTS

| | | |
|---|---|---|
| 10,473,785 B2 | 11/2019 | Kubota et al. |
| 2003/0218919 A1 | 11/2003 | Arita et al. |
| 2017/0082746 A1 | 3/2017 | Kubota et al. |
| 2017/0184709 A1 | 6/2017 | Kienzler et al. |
| 2017/0273161 A1 | 9/2017 | Nakamura |
| 2017/0363740 A1 | 12/2017 | Kubota et al. |
| 2019/0086522 A1 | 3/2019 | Kubota et al. |
| 2019/0086541 A1 | 3/2019 | Kubota et al. |
| 2019/0086542 A1 | 3/2019 | Kubota et al. |
| 2019/0317213 A1 | 10/2019 | Kubota et al. |
| 2020/0088853 A1 | 3/2020 | Kubota et al. |
| 2020/0355806 A1* | 11/2020 | Yoshioka ............... G01S 7/4873 |
| 2021/0026012 A1* | 1/2021 | Kubota ................. G01S 7/4817 |

FOREIGN PATENT DOCUMENTS

| | | |
|---|---|---|
| JP | 2011-215005 A | 10/2011 |
| JP | 2017-125844 A | 7/2017 |
| JP | 2017-173298 A | 9/2017 |
| JP | 2019-52981 A | 4/2019 |
| JP | 2019-184545 A | 10/2019 |
| JP | 2020-46247 A | 3/2020 |

\* cited by examiner

DISTANCE MEASURING DEVICE, DISTANCE MEASURING METHOD, AND SIGNAL PROCESSING METHOD

CROSS-REFERENCE TO RELATED APPLICATIONS

This application is based upon and claims the benefit of priority from Japanese Patent Application No. 2019-047373, filed on Mar. 14, 2019 the entire contents of which are incorporated herein by reference.

FIELD

Embodiments disclosed herein relate to a distance measuring device, a distance measuring method, and a signal processing method.

BACKGROUND

There is known a distance measuring device called LIDAR (Light Detection and Ranging, Laser Imaging Detection and Ranging). The distance measuring device irradiates laser light on a measurement target object and converts the intensity of reflected light reflected by the measurement target object into a time-series luminance signal on the basis of an output of a sensor. Consequently, the distance to the measurement target object is measured on the basis of a time difference between a point in time of emission of the laser light and a point in time corresponding to a peak of a luminance signal value. Ambient light such as sunlight scattered by an object is also made incident on the sensor. The ambient light is noise that occurs at random.

In the distance measuring device in the past, a predetermined number of peaks are selected in descending order of values out of peaks in the time-series luminance signal. A distance value for the largest peak is set as a distance to the measurement target object. However, when peaks of noise are predominant and peaks by the reflected light of the measurement target object are not included in the predetermined number of peaks, it is likely that a distance value to the measurement target object cannot be obtained.

DETAILED DESCRIPTION

Figure 1:
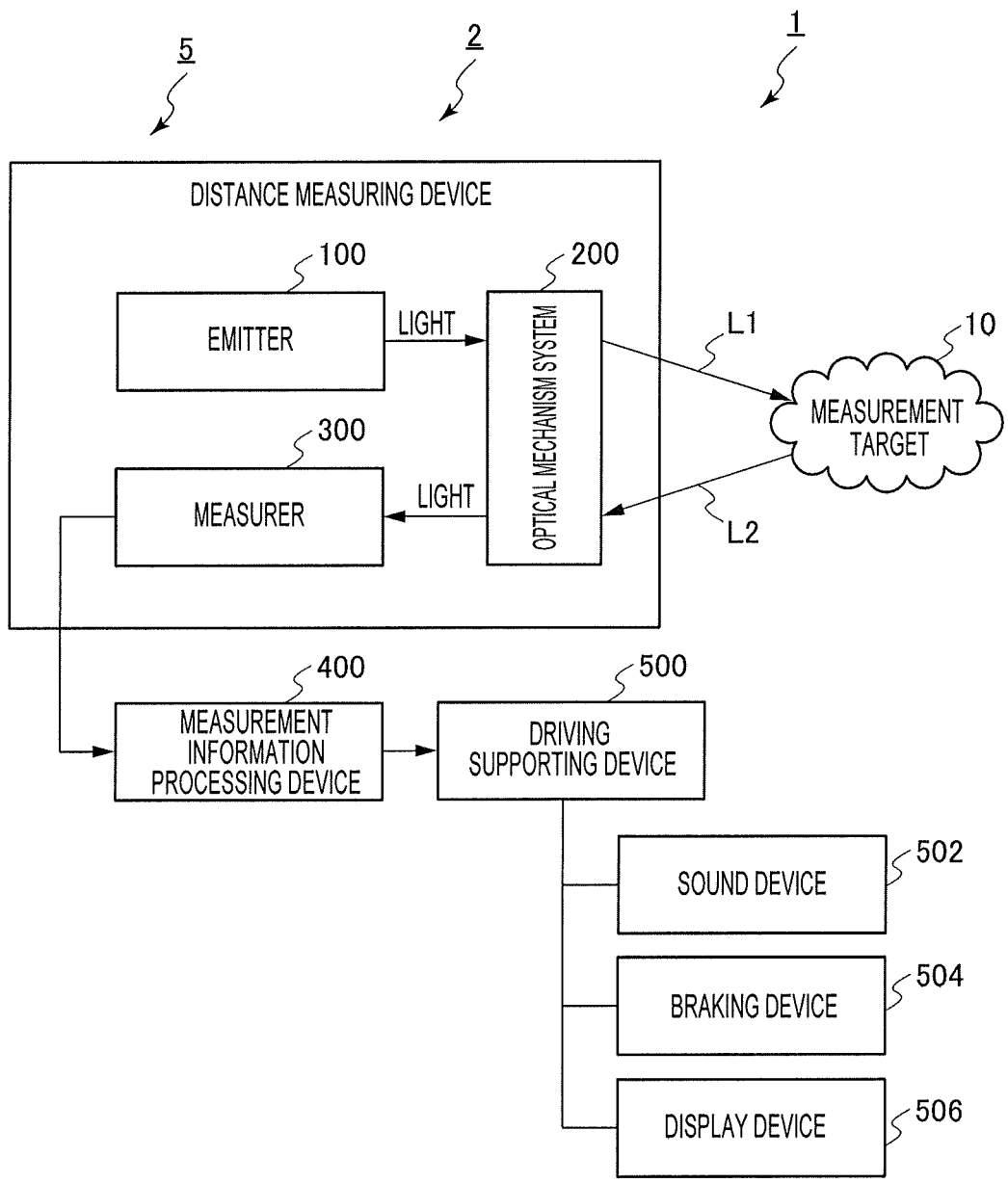
FIG. 1 is a diagram showing a schematic overall configuration of a driving supporting system according to an embodiment.

According to an embodiment, a distance measuring device has a signal processing device that performs processing on time-series luminance signals of each of frames acquired on the basis of reflected lights of laser lights irradiated in order in a plurality of predetermined directions for each of the frames. The distance measuring device includes a storage circuit and a selection circuit. The storage circuit stores information concerning a distance value obtained on the basis of a time-series luminance signal of a preceding frame. The selection circuit selects a peak based on the distance value as a candidate of the distance value out of peaks in the time-series luminance signal in a present frame.

A distance measurement device, a distance measuring method, and a signal processing method according to an embodiment of the present invention are explained in detail below with reference to the drawings. Note that the embodiments explained below are examples of embodiments of the present invention. The present invention is not interpreted to be limited to the embodiments. In the drawings referred to in the embodiments, the same parts and parts having the same functions are denoted by the same or similar reference numerals and signs. Repeated explanation of the portions is sometimes omitted. Dimension ratios of the drawings are sometimes different from actual ratios for convenience of explanation. A part of components is sometimes omitted from the drawings.

EMBODIMENT

FIG. 1 is a diagram showing a schematic overall configuration of a driving supporting system 1 according to an embodiment. As shown in FIG. 1, the driving supporting system 1 performs driving support based on a distance image. The driving supporting system 1 includes a distance measuring system 2, driving supporting device 500, a sound device 502, a braking device 504, and a display device 506. The distance measuring system 2 generates a distance image of a measurement target object 10 and includes a distance measuring device 5 and a measurement information processing device 400.

The distance measuring device 5 measures a distance to the measurement target object 10 using a scanning scheme or a TOF (Time Of Flight) scheme. More specifically, the distance measuring device 5 includes an emitter 100, an optical mechanism system 200, and a measurement circuit 300.

The emitter 100 intermittently emits laser light L1. The optical mechanism system 200 irradiates the laser light L1 emitted by the emitter 100 on the measurement target object 10 and makes reflected light L2 of the laser light L1 reflected on the measurement target object 10 incident on the measurement circuit 300. The laser light means light having an aligned phase and an aligned frequency. The reflected light L2 means light in a predetermined direction among scattered lights by the laser light L1.

The measurement circuit 300 measures the distance to the measurement target object 10 on the basis of the reflected light L2 received via the optical mechanism system 200. That is, the measurement circuit 300 measures the distance to the measurement target object 10 on the basis of a time difference between a point in time when the emitter 100 irradiates the laser light L1 on the measurement target object 10 and a point in time when the reflected light L2 is measured.

The measurement information processing device 400 performs noise reduction processing and outputs distance image data on the basis of distances to a plurality of measurement points on the measurement target object 10. A part or all of the measurement information processing device 400 may be incorporated in a housing of the distance measuring device 5.

The driving supporting device 500 supports driving of a vehicle according to an output signal of the measurement information processing device 400. The sound device 502, the braking device 504, the display device 506, and the like are connected to the driving supporting device 500.

The sound device 502 is, for example, a speaker and is dispose in a position audible from a driver's seat in the vehicle. The driving supporting device 500 causes, on the basis of an output signal of the measurement information processing device 400, for example, the sound device 502 to generate sound such as "five meter to a target object". Consequently, for example, even when attention of the driver decreases, it is possible to cause the driver to hear the sound to call the attention of the driver.

The braking device 504 is, for example, an auxiliary brake. The driving supporting device 500 causes, on the basis of an output signal of the measurement information processing device 400, the braking device 504 to brake the vehicle, for example, when the target object approaches a predetermined distance, for example, 3 meters to the vehicle.

The display device 506 is, for example, a liquid crystal monitor. The driving supporting device 500 displays an image on the display device 506 on the basis of an output signal of the measurement information processing device 400. Consequently, for example, even at the time of backlight, it is possible to accurately grasp external information by referring to the image displayed on the display device 506.

Figure 2:
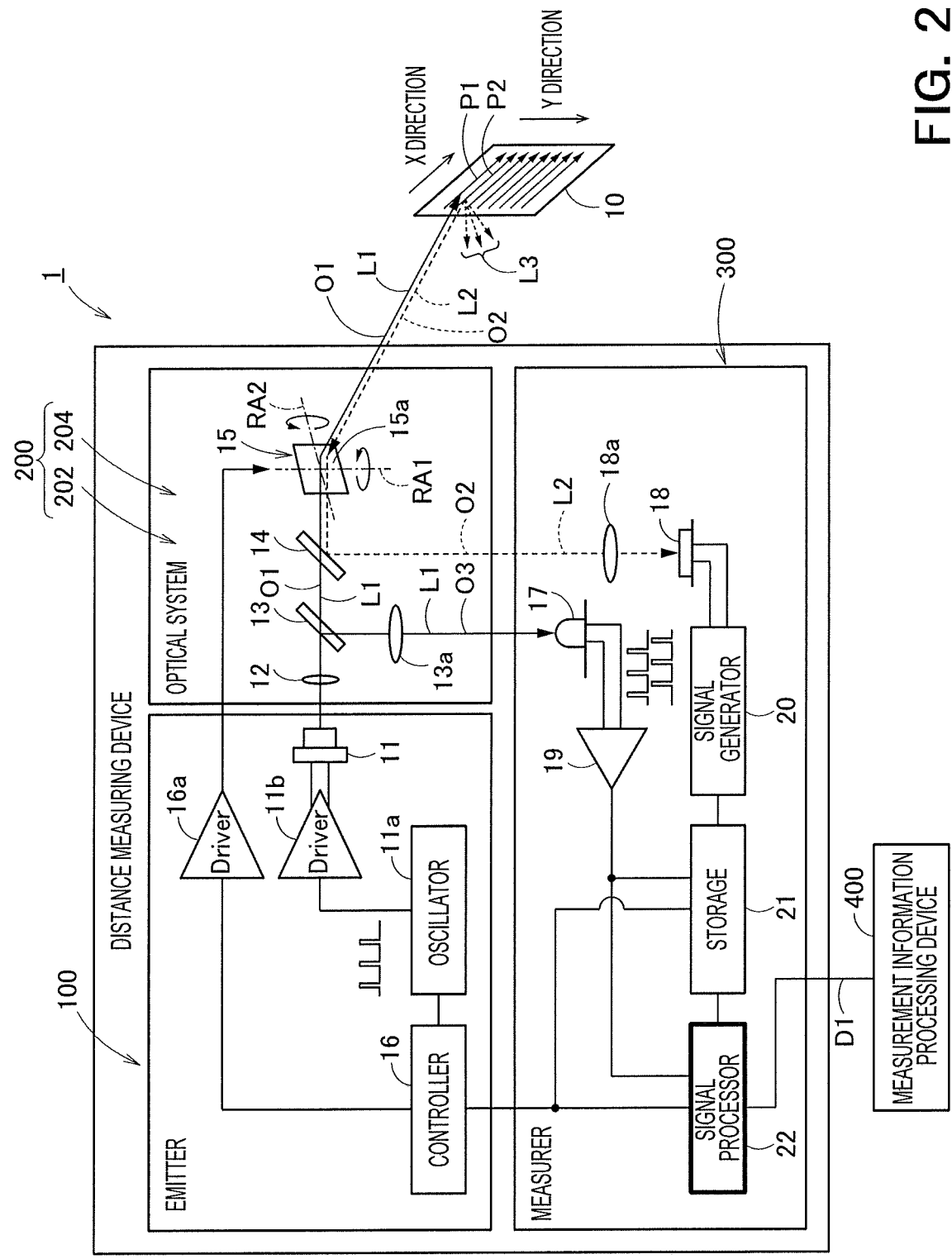
FIG. 2 is a diagram showing a configuration example of a distance measuring device according to a first embodiment.

More detailed configuration examples of the emitter 100, the mechanism optical mechanism system 200, and the measurement circuit 300 of the distance measuring device 5 according to the embodiment are explained with reference to FIG. 2. FIG. 2 is a diagram showing a configuration example of the distance measuring device 5 according to the first embodiment. As shown in FIG. 2, the distance measuring device 5 includes the emitter 100, the optical mechanism system 200, the measurement circuit 300, and the measurement information processing device 400. Among scattered lights L3, scattered light in a predetermined direction is referred to as reflected light L2.

The emitter 100 includes a light source 11, an oscillator 11a, a first driving circuit 11b, a control circuit 16, and a second driving circuit 16a.

The optical mechanism system 200 includes an irradiation optical system 202 and a light-receiving optical system 204. The irradiation optical system 202 includes a lens 12, a first optical element 13, a lens 13a, and a mirror (a reflection device) 15.

The light-receiving optical system 204 incudes a second optical element 14 and the mirror 15. That is, the irradiation optical system 202 and the light-receiving optical system 204 share the mirror 15.

The measurement circuit 300 includes a photodetector 17, a sensor 18, a lens 18a, a first amplifier 19, a signal generation circuit 20, a storage circuit 21, and a signal processing circuit 22. Note that, as an existing method for scanning light, there is a method of rotating the distance measuring device 5 to scan light (hereinafter referred to as rotating method). As another existing method for scanning light, there is an OPA method (Optical Phased Array). This embodiment does not rely on a method of scanning light. Therefore, light may be scanned by the rotating method or the OPA method. The signal processing circuit 22 according to this embodiment corresponds to a signal processing device.

The oscillator 11a of the emitter 100 generates a pulse signal on the basis of control by the control circuit 16. The first driving circuit 11b drives the light source 11 on the basis of the pulse signal generated by the oscillator 11a. The light source 11 is a laser light source such as a laser diode. The light source 11 intermittently emits the laser light L1 according to driving by the first driving circuit 11b.

Figure 3:
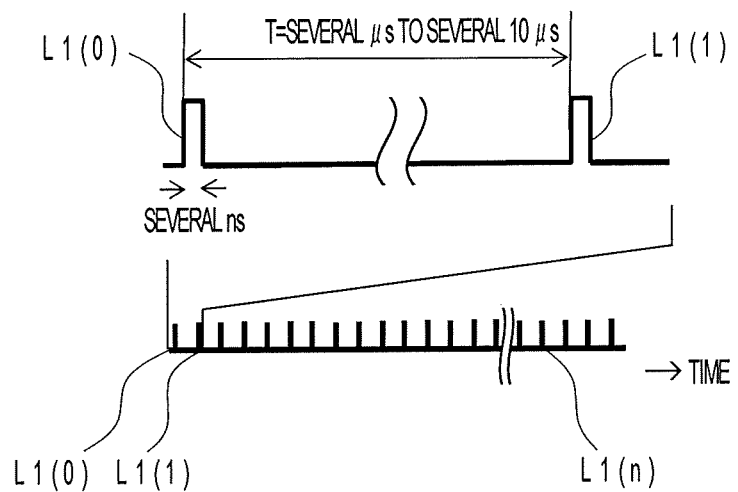
FIG. 3 is a diagram schematically showing an emission pattern of a light source in one frame.

FIG. 3 is a diagram schematically showing an emission pattern of the light source 11 in one frame. In FIG. 3, the horizontal axis indicates time and the vertical axis indicates emission timing of the light source 11. A figure on the upper side is an enlarged part view in a figure on the lower side. As shown in FIG. 3, the light source 11 intermittently repeatedly emits laser light L1($n$) (0≤$n$<N), for example, at an interval of T=several microseconds to several ten microseconds. The laser light L1 emitted n-th is represented as L1($n$). "N" indicates the number of times of irradiation of the laser light L1($n$) irradiated to measure the measurement target object 10 in one frame. When the irradiation for one frame ends, irradiation for the next frame is started from L1(0).

As shown in FIG. 2, the light source 11, the lens 12, the first optical element 13, the second optical element 14, and the mirror 15 are disposed in this order on an optical axis O1 of the irradiation optical system 202. Consequently, the lens 12 collimates the intermittently emitted laser light L1 and guides the laser light L1 to the first optical element 13.

The first optical element 13 transmits the laser light L1 and makes a part of the laser light L1 incident on the photodetector 17 along an optical axis O3. The first optical element 13 is, for example, a beam splitter.

The second optical element 14 further transmits the laser light L1 transmitted through the first optical element 13 and makes the laser light L1 incident on the mirror 15. The second optical element 14 is, for example, a half mirror.

The mirror 15 includes a reflection surface 15a that reflects the laser light L1 intermittently emitted from the light source 11. The reflection surface 15a is capable of rotating around, for example, two rotation axes RA1 and RA2 crossing each other. Consequently, the mirror 15 cyclically changes an irradiation direction of the laser light L1.

The control circuit 16 includes, for example, a CPU (Central Processing Unit). The control circuit 16 performs, on the second driving circuit 16a, control for continuously changing an inclination angle of the reflection surface 15a. The second driving circuit 16a drives the mirror 15 according to a driving signal supplied from the control circuit 16. That is, the control circuit 16 controls the second driving circuit 16a to change the irradiation direction of the laser light L1.

Figure 4A:
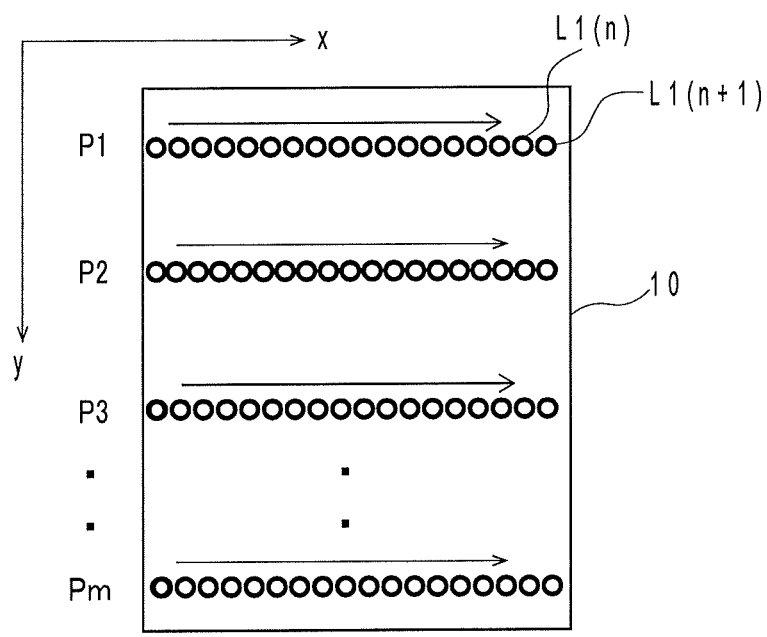
FIG. 4A is a schematic diagram enlarging and showing irradiation positions of laser lights on a measurement target object in one frame.

FIG. 4A is a schematic diagram enlarging and showing irradiation positions of the laser light L1 on the measurement target object 10 in one frame. As shown in FIG. 4, the reflection surface 15a changes the irradiation direction for each laser light L1 and discretely irradiates the laser light L1 along a substantially parallel plurality of linear paths P1 to Pm (m is a natural number equal to or larger than 2) on the measurement target object 10. In this way, the distance measuring device 5 according to this embodiment irradiates the laser light $L1(n)$ ($0' n < N$) toward the measurement target object 10 once at a time while changing an irradiation direction $O(n)$ ($0 \leq n < N$) of the laser light $L1(n)$ for each frame $f(m)$ ($0 \leq m < M$). The irradiation direction of the laser light $L1(n)$ is represented as $O(n)$. That is, in the distance measuring device 5 according to this embodiment, the laser light $L1(n)$ is irradiated once in the irradiation direction $O(n)$.

Figure 4B:
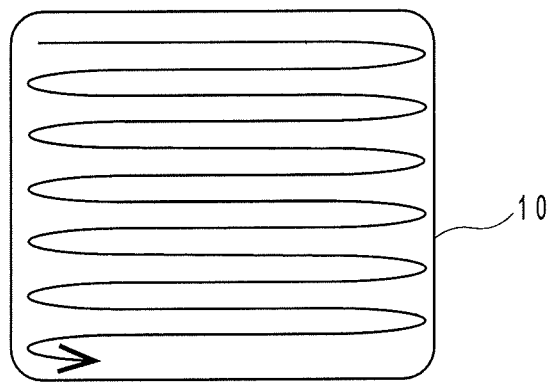
FIG. 4B is a schematic diagram enlarging and showing irradiation positions on the measurement target object in irradiation order different from irradiation order in FIG. 4A.
Figure 4C:
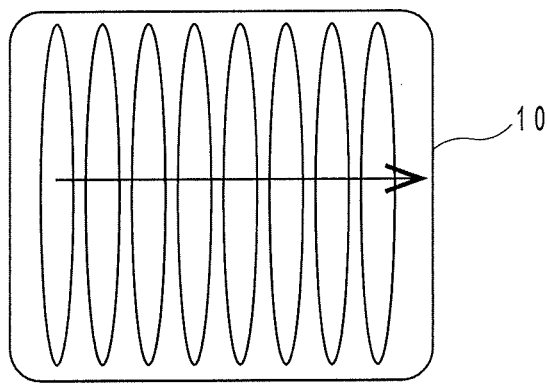
FIG. 4C is a diagram showing an example in which a vertical one row is simultaneously irradiated using a one-dimensional laser light source.

FIG. 4B is a schematic diagram enlarging and showing irradiation positions on the measurement target object 10 in irradiation order different from irradiation order in FIG. 4A. FIG. 4C is a diagram showing an example in which a vertical one row is simultaneously irradiated using a one-dimensional laser light source.

Figure 4D:
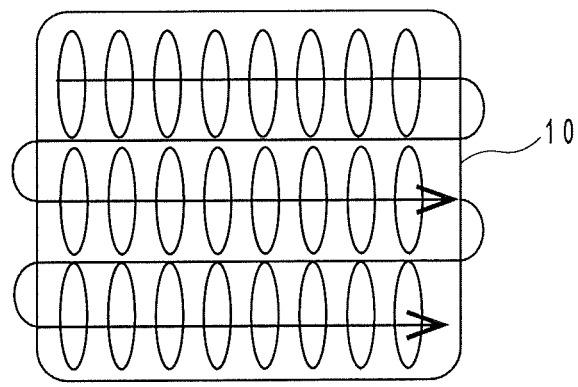
FIG. 4D is a diagram showing an example in which the vertical one row is simultaneously irradiated for each horizontal row using the one-dimensional laser light source.

FIG. 4D is a diagram showing an example in which the vertical one row is simultaneously irradiated for each horizontal row using the one-dimensional laser light source.

In this way, the laser light $L1(n)$ according to this embodiment is sequentially irradiated on one point at a time as shown in FIGS. 4A and 4B. However, the laser light $L1(n)$ is not limited to this and may be simultaneously irradiated on a plurality of points. For example, a vertical one row may be simultaneously irradiated using a one-dimensional laser light source as shown in FIG. 4C or 4D. To simplify explanation, the measurement target object 10 is schematically illustrated in a flat shape in FIG. 5. However, in actual measurement, the measurement target object 10 is, for example, an automobile.

Figure 5:
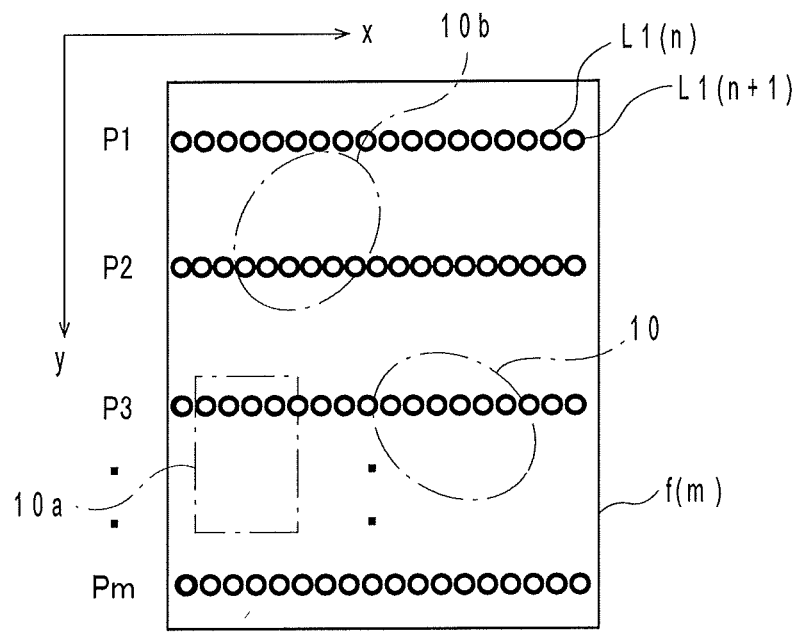
FIG. 5 is a diagram showing an example in which a measurement target object is present in a partial region in an irradiation range.

FIG. 5 is a diagram showing an example in which the measurement target object 10 is present in a partial region of an irradiation range. As shown in FIG. 5, the measurement target object 10 is present in a partial region of an irradiation range of the laser light L1. For example, a building 10a, another automobile 10b, a person, a road, and the sky are present outside the range of the measurement target object 10. Therefore, a position where a reflection target object including the measurement target object 10 is different for each irradiation direction $O(n)$ ($0 \leq n < N$) of the laser light $L1(n)$ ($0 \leq n < N$). Therefore, a measured distance is different for each frame $f(m)$ ($0 \leq m < M$).

An interval of irradiation positions of laser lights $L1(n)$ and $L1(n+1)$ on the measurement target object 10 corresponds to the irradiation interval T=several microseconds to several ten microseconds (FIG. 3) between the laser lights L1. In this way, the laser lights L1 having different irradiation directions are discretely irradiated on the linear paths P1 to Pm. Note that the number of linear paths and a scanning direction are not particularly limited.

As shown in FIG. 2, on an optical axis O2 of the light receiving optical system 204, the reflection surface 15a of the mirror 15, the second optical element 14, the lens 18a, and the sensor 18 are disposed in the order of incidence of the reflected light L2. The optical axis O1 is a focal axis of the lens 12 that passes the center position of the lens 12. The optical axis O2 is a focal axis of the lens 18a that passes the center position of the lens 18a.

The reflection surface 15a makes the reflected light L2 traveling along the optical axis O2 among the scattered lights L3 scattered on the measurement target object 10 incident on the second optical element 14. The second optical element 14 changes a traveling direction of the reflected light L2 reflected on the reflection surface 15a and makes the reflected light L2 incident on the lens 18a of the measurement circuit 300 along the optical axis O2. The lens 18a condenses the reflected light L2 made incident along the optical axis O2 to the sensor 18.

On the other hand, a traveling direction of light reflected in a direction different from the direction of the laser light L1 among the scattered lights L3 deviates from the optical axis O2 of the light-receiving optical system 204. Therefore, even if the light reflected in the direction different from the direction of the optical axis O2 among the scattered lights L3 is made incident in the light-receiving optical system 204, the light is absorbed by a black body in a housing in which the light-receiving optical system 204 is disposed or is made incident on a position deviating from an incident surface of the sensor 18. On the other hand, among ambient lights such as sunlight scattered by some object, there are lights traveling along the optical axis O2. These lights are made incident on the incident surface of the sensor 18 at random and become random noise.

Note that, in FIG. 2, optical paths of the laser light L1 and the reflected light L2 are separately shown for clarification. However, actually, the laser light L1 and the reflected light L2 overlap. An optical path in the center of a light beam of the laser light L1 is shown as the optical axis O1. Similarly, an optical path of the center of a light beam of the reflected light L2 is shown as the optical axis O2.

The sensor 18 detects the reflected light L2 made incident from the lens 18a. The sensor 18 converts the reflected light L2 received via the light-receiving optical system 204 into an electric signal.

The signal generation circuit 20 converts the electric signal output by the sensor 18 into a time-series luminance signal at a predetermined sampling interval. The signal generation circuit 20 is configured by, for example, an amplifier that amplifies the electric signal based on the reflected light L2 and an AD converter (ADC: Analog to Digital Converter). The amplifier amplifies the electric signal of the sensor 18. The AD converter samples the amplified electric signal at a plurality of sampling timings and converts the electric signal into a time-series luminance signal corresponding to an irradiation direction of the laser light L1.

Figure 6:
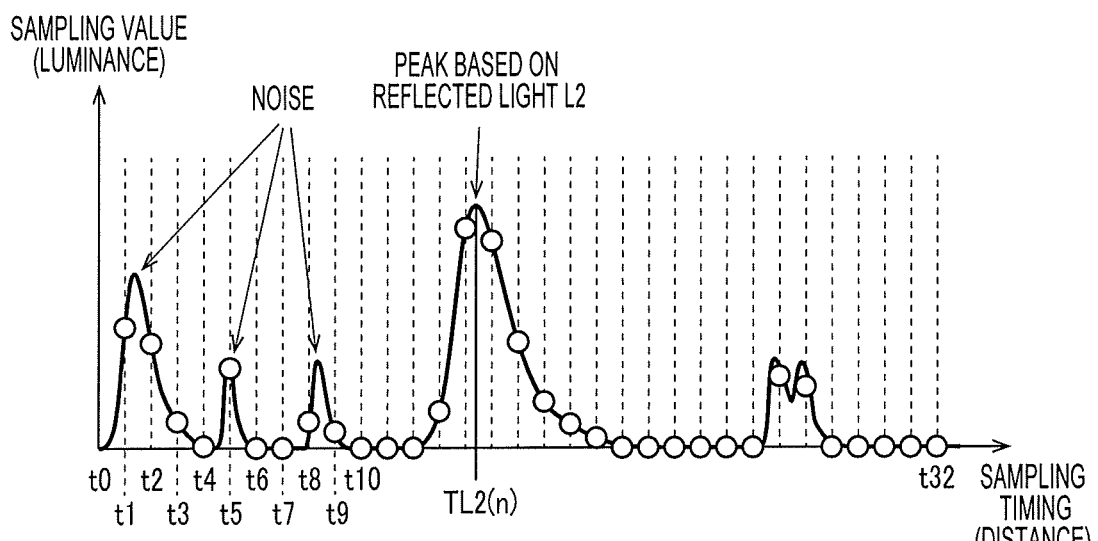
FIG. 6 is a diagram showing an example of a time-series luminance signal of a present frame.

FIG. 6 is a diagram showing an example of a time-series luminance signal B(m, x, y) in a present frame f(m). That is, FIG. 6 is a diagram showing an example of a sampling value of an electric signal by the signal generation circuit 20. The horizontal axis of FIG. 5 indicates sampling timing and the vertical axis of FIG. 5 indicates a sampling value, that is, a luminance value of the time-series luminance signal B(m, x, y).

For example, sampling timings obtained by adding a blanking time to sampling timings t0 to t32 correspond to an elapsed time "T" (FIG. 3) from when the laser light L1(n) is irradiated until the next laser light L1(n+1) is irradiated. A peak in the figure is a sampling value based on the reflected light L2. Sampling timing TL2 indicating the peak corresponds to a double of the distance to the measurement target object 10.

More specifically, the distance is calculated by the following expression: distance=light speed×(sampling timing TL2−timing when the photodetector 17 detects the laser light L1)/2. The sampling timing is an elapsed time from light emission start time of the laser light L1.

In the time-series luminance signal B(m, x, y), m (0≤m<M) indicates a number of a frame f. A coordinate (x, y) indicates a coordinate decided on the basis of an irradiation direction of the laser light L1(n) (0≤n<N). That is, the coordinate (x, y) corresponds to a coordinate at the time when a distance image of the present frame f(m) is generated. More specifically, as shown in FIG. 5, a coordinate (0, 0) corresponding to L1(0) is set as the origin. The number of irradiations L1(n) (0≤n<N) in the horizontal direction is represented as HN. A function [a] is a function indicating a maximum integer equal to or smaller than "a". In this case, x=n−[n÷HN]×HN and y=[n÷HN]. Note that the number of sampling timings and a time range in which sampling is performed shown in the figure are examples. The number of sampling timings and the time range in which the sampling is performed may be changed. As the luminance signal B(m, x, y), luminance signals of near coordinates may be integrated and used. For example, luminance signals in coordinate ranges of 2×2, 3×3, and 5×5 may be integrated.

As shown in FIG. 2, the storage circuit 21 is realized by, for example, a semiconductor memory element such as a RAM (Random Access Memory) or a flash memory, a hard disk, or an optical disk.

Figure 7:
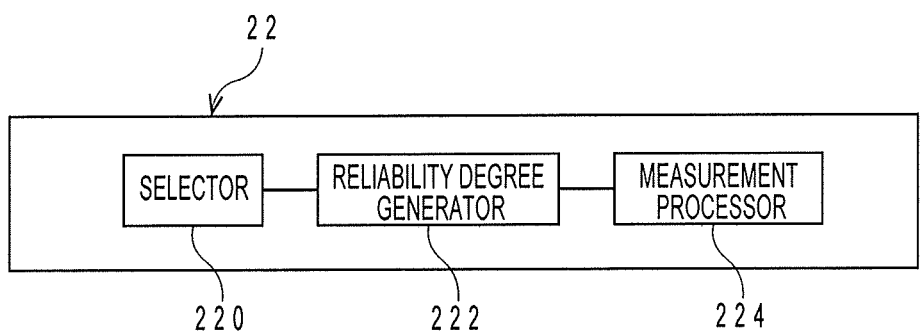
FIG. 7 is a block diagram showing the configuration of a signal processing circuit.

FIG. 7 is a block diagram showing the configuration of the signal processing circuit 22. As shown in FIG. 7, the signal processing circuit 22 is configured by, for example, a logic circuit including an MPU (Micro Processing Unit). The signal processing circuit 22 measures a distance on the basis of a time difference between timing when the photodetector 17 detects the laser light L1 and timing when the sensor 18 detects the reflected light L2. That is, the signal processing circuit 22 is a processor that generates a corresponding distance value for each time-series luminance signal B(m, x, y) (0≤x<HN, 0≤x<YN). The signal processing circuit 22 includes a selection circuit 220, a reliability-degree generation circuit 222, and a measurement processing circuit 224.

The selection circuit 220 selects one or a plurality of peaks p of time-series luminance signals B (m, x, y) (0≤x<HN, 0≤y<VN) in the present frame f(m) using information concerning a distance value Dis(m−1, x, y) (0≤x<HN, 0≤y<VN) obtained on the basis of a time-series luminance signal B(m−1, x, y) of a preceding frame f(m−1). The distance value Dis(m−1, x, y) (0≤x<HN, 0≤y<VN) is stored in the storage circuit 21 and acquired from the storage circuit 21 by the selection circuit 220. Note that details of the selection circuit 220 are explained below.

The reliability-degree generation circuit 222 generates a reliability degree corresponding to the peak values selected for each of the time-series luminance signals B (m, x, y) (0≤x<HN, 0≤y<VN). Details of the reliability-degree generation circuit 222 are also explained below.

The measurement processing circuit 224 generates distance values Dis(m, x, y) (0≤x<HN, 0≤y<VN) corresponding to each of the time-series luminance signals B (m, x, y) (0≤x<HN, 0≤y<VN) in the present frame f(m) on the basis of the reliability degrees corresponding to the peak values selected for each of the time-series luminance signals B (m, x, y) (0≤x<HN, 0≤y<VN). The distance values Dis(m, x, y) (0≤x<HN, 0≤y<VN) are stored in the storage circuit 21.

A detailed processing example of the selection circuit 220 is explained with reference to FIGS. 8 to 10.

Figure 8:
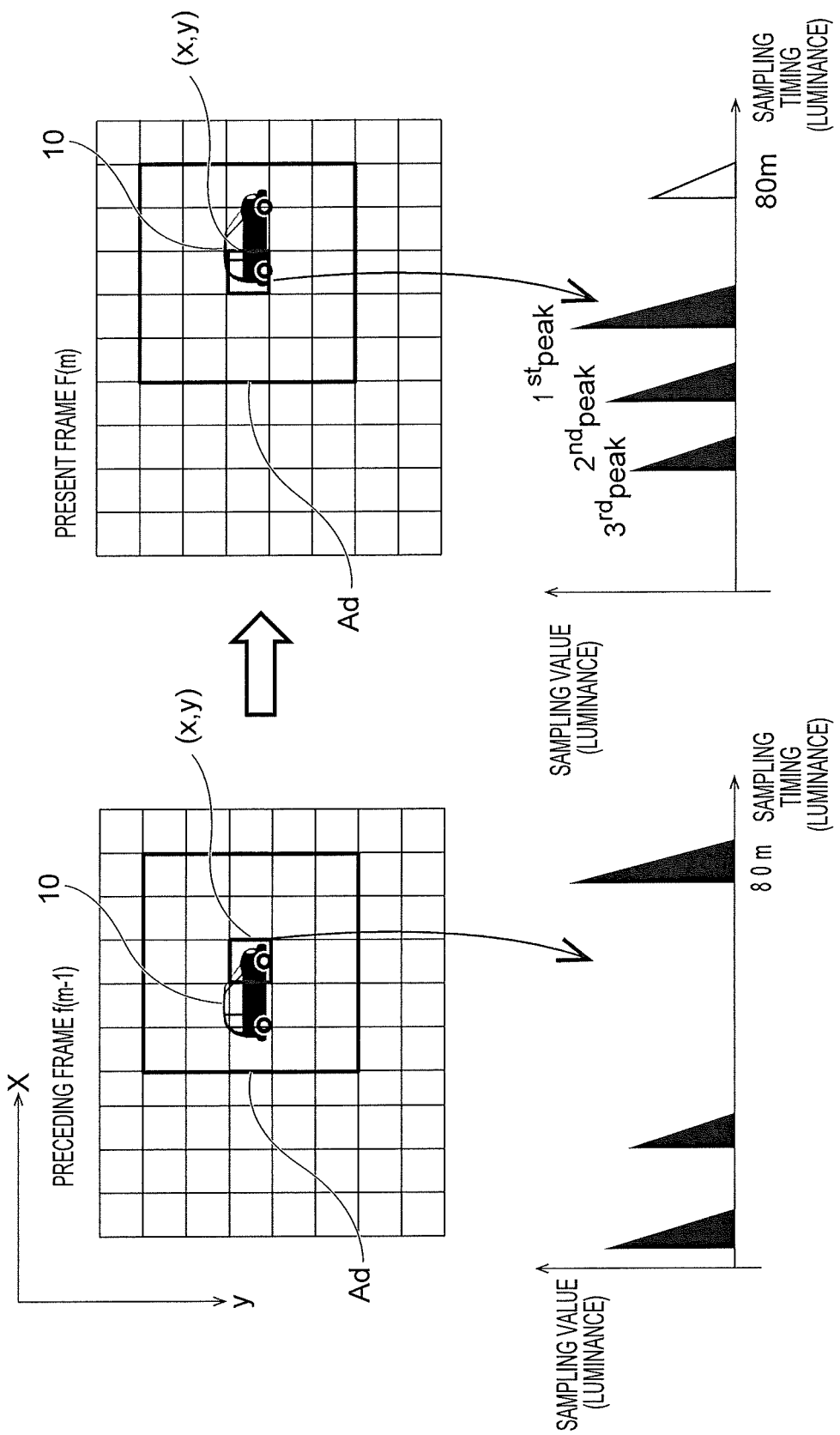
FIG. 8 is a diagram schematically showing an adjacent region and a time-series luminance signal.

FIG. 8 is a diagram schematically showing examples of an adjacent region Ad and the time-series luminance signal B(m−1, x, y) in the coordinate (x, y) in the preceding frame f(m−1) and the adjacent region Ad and the time-series luminance signal B(m, x, y) in the coordinate (x, y) in the present frame f(m). An upper left figure shows the adjacent region Ad in the coordinate (x, y) in the preceding frame f(m−1). A lower left figure shows the time-series luminance signal B(m−1, x, y) in the coordinate (x, y). An upper right figure shows the adjacent region Ad in the coordinate (x, y) in the present frame f(m). A lower right figure shows the time-series luminance signal B(m, x, y) in the coordinate (x, y) in the present frame f(m). A center coordinate (x, y) of the adjacent region Ad is indicated by a thick line. The measurement target object 10 is, for example, an automobile. The measurement target object 10 is moving from the left to the right along an x axis 80 meters ahead on the optical axis O1 of the irradiation optical system 202 in the distance measuring device 5 (FIG. 2). The adjacent region Ad indicates a range corresponding to laser light L1(n) (n=HN× (Y−1)+X, x−nd≤X≤x+nd, y−nd≤Y≤y+nd) irradiated in a direction within a predetermined range from an irradiation direction of laser light L1(n) (n=HN×(y−1)+x) corresponding to the time-series luminance signal B(m, x, y); where nd=2. That is, the adjacent region Ad is a coordinate range of (2*nd+1)×(2*nd+1) centering on the coordinate (x, y).

As shown in FIG. 8, in the time-series luminance signal B(n−1, x, y) of the preceding frame f(m−1), a peak corresponding to a position of 80 meters of the measurement target object 10 appears. On the other hand, in the example of the time-series luminance signal B(m, x, y) of the present frame f(m), noise light predominantly appears as first to third peaks and a peak corresponding to the position of 80 meters of the measurement target object 10 appears as a fourth peak. In such a case, the position of 80 meters of the measurement target object 10 cannot be obtained by a general measurement method for measuring the first peak as a distance value.

Figure 9:
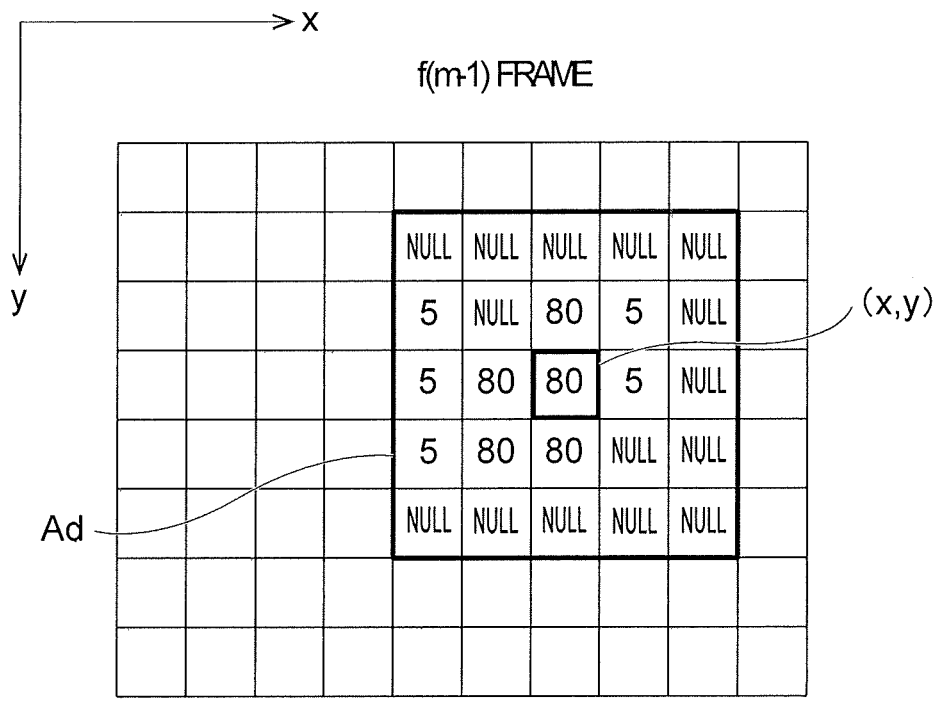
FIG. 9 is a diagram showing an adjacent distance obtained in the adjacent region on the basis of the time-series luminance signal.

FIG. 9 is a diagram corresponding to the upper left figure of FIG. 8 and is a diagram showing an adjacent distance NDis(m−1, X, Y) (x−nd≤X≤x+nd, y−nd≤Y≤y+nd) obtained in the adjacent region Ad on the basis of the time-series luminance signal B(m−1, X, Y) (x−nd≤X≤x+nd, y−nd≤Y≤y+nd) in the preceding frame f(m−1). A center coordinate (x, y) of the adjacent region Ad is indicated by a thick line. For example, the adjacent distance NDis(m−1, X, Y) (x−nd≤X≤x+nd, y−nd≤Y≤y+nd) indicates 5 meters, 80 meters, and NULL. 5 meters indicates a distance to an object other than the measurement target object 10. 80 meters indicates a distance to the measurement target object 10. NULL is, for example, a space region, a road, or the like on the background and indicates that a reliability degree is low and a measurement value is discarded.

Figure 10:
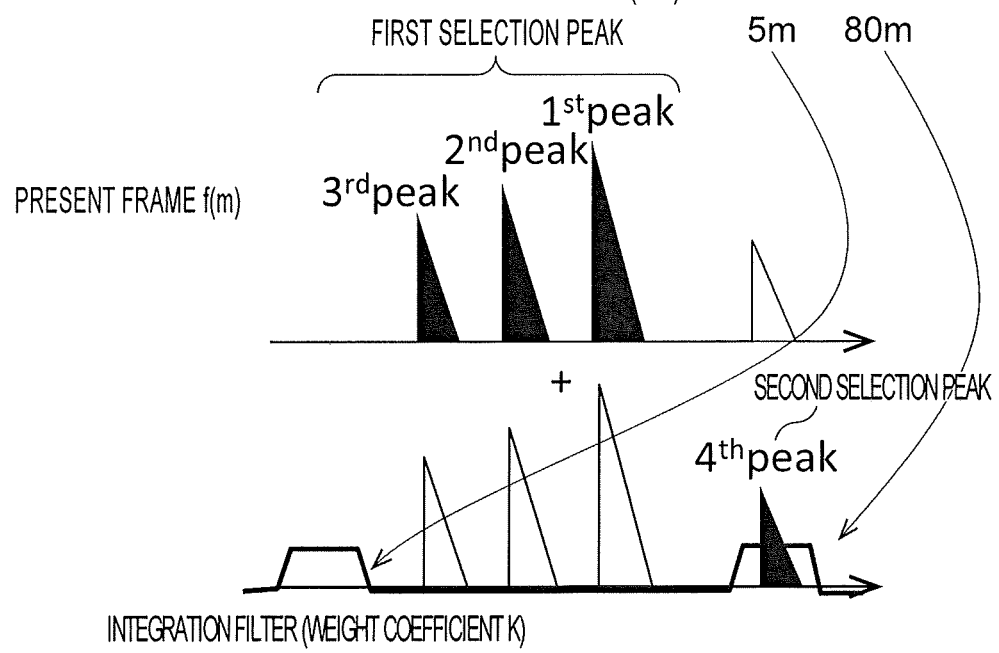
FIG. 10 is a diagram showing an example of selection processing of a selection circuit.

FIG. 10 is a diagram showing an example of selection processing of the selection circuit 220. As shown in FIG. 10, for example, 5 meters and 80 meters indicate the adjacent distance NDis(m−1, X, Y) (x−nd≤X≤x+nd, y−nd≤Y≤y+nd) obtained in the adjacent region Ad (FIG. 9) in the coordinate (x, y).

The selection circuit 220 selects a predetermined number of first selection peaks (first to third peaks) of the time-series luminance signal B(m, x, y) in the present frame f(m) in order from the largest peak and further selects a predetermined second selection peak (a fourth peak) of the time-series luminance signal B(m, x, y) in the present frame f(m) using information concerning the adjacent distance values (5 meters and 80 meters) in the preceding frame f(m−1). The predetermined number of the first selection peaks is, for example, three.

More specifically, the selection circuit 220 multiplies the time-series luminance signal B(m, x, y) by an integration filter (window) having time-series values in which a value of a time position corresponding to the adjacent distance NDis (m−1, X, Y) (x−nd≤X≤x+nd, y−nd≤Y≤y+nd) obtained in the adjacent region Ad in the coordinate (x, y) is a coefficient K and the other ranges are, for example, 0. K is, for example, 1. The selection circuit 220 selects, as the second selection peak, a peak obtained by this integration filter processing. The selection circuit 220 performs processing for adding the second selection peak to the first selection peak as a predetermined selection peak. For example, when there are five types of adjacent distances obtained in the adjacent region Ad (FIG. 9), ranges in which K is 1 are five parts in the integration filter (window). The ranges in which K is 1 are ranges in which a temporal margin is given to time positions corresponding to the adjacent distances. The selection circuit 220 sets a range of the adjacent region Ad (FIG. 9) based on a range in which the measurement target object 10 moves between frames. Consequently, even if the measurement target object 10 moves at assumed speed or less, a peak corresponding to the measurement target object 10 can be included in the second selection peak. Note that, in the integration filter (window) according to this embodiment, the value outside the range in which K is 1 is set to 0. However, the value is not limited to this. A numerical value such as 0.1 may be given.

In this way, the selection circuit 220 selects the predetermined number of first selection peaks for each time-series luminance signal B(m, x, y) (0≤x<HN, 0≤x<YN) in the present frame f(m) in order from the peak having the largest peak value and further selects the second selection peak value of each time-series luminance signal B(m, x, y) (0≤x<HN, 0≤x<YB) in the present frame f(m) using the information concerning am adjacent distance value NDist (m−1, X, Y) (x−nd≤X≤x+nd, y−nd≤Y≤y+nd, 0≤x<HN, 0≤x<YN) in the preceding frame f(m−1). That is, the selection circuit 220 acquires the adjacent distance value NDist (m−1, X, Y) (x−nd≤X≤x+nd, y−nd≤Y≤y+nd, 0≤x<HN, 0≤x<YN) based on the laser light L1(n) (n=HN×(Y−1)+X, x−nd≤X≤x+nd, y−nd≤Y≤y+nd) of the preceding frame f(m−1) irradiated in a direction within a predetermined range from an irradiation direction of the laser light L1(n) (n=HN× (y−1)+x) corresponding to each time-series luminance signal B(m, x, y) (0≤x<HN, 0≤x<YN) in the present frame f(m) and selects the second peak value in a range corresponding to the adjacent distance value NDist(m−1, X, Y) (x−nd≤X≤x+nd, y−nd≤Y≤y+nd, 0≤x<HN, 0≤x<YN) for each time-series luminance signal B(m, x, y) (0≤x<HN, 0≤x<YN).

The selection circuit 220 is configured not to select the second selection peak when an S/N ratio of the luminance signal B(m, x, y) exceeds a predetermined value. When the S/N ratio is good, an effect due to inter-frame integration is small. Therefore, when the S/N ratio is good, it is possible to suppress deterioration in selection accuracy of a peak due to the inter-frame integration by not selecting the second selection peak.

In this way, it is possible to add the second selection peak to the first selection peak as the predetermined selection peak. For example, when noise or the like is mixed and only the first selection peak is selected, the fourth peak or the like corresponding to the measurement target object 10 is sometimes not selected. On the other hand, by selecting the second selection peak corresponding to the adjacent distance NDis(m−1, X, Y) (x−nd≤X≤x+nd, y−nd≤Y≤y+nd), even when the fourth peak or the like is not included in the first selection peak, a peak based on reflected light from the measurement target object 10 can be included in the second selection peak.

In this embodiment, a time-series luminance signal (an ADC result or an integration result of the ADC result) of the preceding frame is not retained and a result of the preceding frame is not directly integrated. Only a detection result of the preceding frame is retained in the storage circuit 21. Therefore, it is possible to reduce likelihood of wrong distance measurement and an increase in a distance measurement error due to an old result of the preceding frame. For example, an integration filter (window) corresponding to 5 m in FIG. 10 in which a peak of a present frame is absent does not affect a distance measurement result and is not a cause of wrong distance measurement. Since it is unnecessary to retain the time-series luminance signal of the preceding frame, it is possible to suppress a storage capacity of the storage circuit 21 to less than 2 percent compared with when the time-series luminance signal of the preceding frame is retained. For example, implantation is possible with addition of up to 1.73 MB with respect to the conventional integration method SAT to a frame of horizontal 450 pixels and vertical 192 pixels. A data amount is 1.8% or less compared with a data amount 95 MB of the ADC result of the preceding frame.

A detailed processing example of the reliability-degree generation circuit 222 is explained. The reliability-degree generation circuit 222 changes a calculation method for a reliability degree according to information in use.

[Math 1]

$$R1(p,m,x,y)=\sqrt{R11(p,m,x,y)^2+R12(p,m,x,y)^2} \qquad (1)$$

At a first reliability degree $R1(p, m, x, y)$ (0≤p<PN, 0≤x<HN, 0≤x<YN) indicated by Expression (1), a distance value $D(a, m, x, y)$ (1≤a≤PN, 0≤x<HN, 0≤x<YN) of a peak "a" of the present frame f(m) and a luminance value Lumi(a, m, x, y) (1≤a≤PN, 0≤x<HN, 0≤x<YN) corresponding to the distance value $D(a, m, x, y)$, a distance value $D(a, m−1, x, y)$ (a=1, 0≤x<HN, 0≤x<YN 0≤x<YN) of a peak "a" of the preceding frame f(m−1) and a luminance value Lumi(a, m−1, x, y) (a=1, 0≤x<HN, 0≤x<YN) corresponding to the distance value $D(a, m−1, x, y)$, and information $E(m, x, y)$ (0≤x≤HN, 0≤x<YN) of ambient light of the present frame f(m) and information $E(m−1, x, y)$ (0≤x≤HN, 0≤x<YN) of ambient light of the preceding frame f(m−1) are stored in the storage circuit 21.

In the above expression, "p" is a number of a peak selected by the selection circuit 220 and corresponds to order of sizes of peaks. For example, p=1 indicates the first peak and p=2 indicates the second peak. PN is a number of peaks selected by the selection circuit 220 and is based on a number selected according to an adjacent distance obtained in the adjacent region Ad (FIG. 9). In the above expression, "a" is 1. That is, the distance value D (a, m−1, x, y) of the peak "a" is the same value as the distance value Dis(m−1, x, y). Note that, as the distance value D(a, m−1, x, y) of the preceding frame f(m−1) according to this embodiment, the distance value Dis(m−1, x, y) is used. However, the distance value D(a, m−1, x, y) is not limited to this and may be selected considering the number of coupled peaks in the luminance value B(m−1, x, y) and a luminance value.

A first reliability degree R1(p, m, x, y) indicated by Expression (1) is, for example, a square root of an added-up value of a first reliability degree R11(p, m, x, y) indicated by Expression (2) and a second reliability degree R12(p, m, x, y) indicated by Expression (3).

The first reliability degree R11(p, m, x, y) (0≤p<PN, 0≤x<HN, 0≤x<YN) is a reliability degree calculated using the distance value D(a, m, x, y) (1≤a≤PN, 0≤x<HN, 0≤x<YN) of the peak "a" of the present frame f(m); where nd1 and nd2 are constants indicating a range of an adjacent region of the coordinate (x, y). For example, nd1=3 and nd2=3.

each coordinate (x, y). Similarly, in Expression (3), a threshold TH(m−1, x, y) (0≤x<HN, 0≤x<YN) based on the ambient light E(m−1, x, y) (0≤x<HN, 0≤x<YN) is used.

As it is seen from this, a larger number of peaks "a" having equivalent distance values are present in an adjacent region with respect to a peak p. The first reliability degree R11 increases as a luminance value of the peaks "a" increases. In the peak p corresponding to the measurement target object 10, since the peaks "a" having the equivalent distance value occur in the adjacent region, the first reliability degree R11(p, m, x, y) further increases. On the other hand, the peak p corresponding to noise occurs at random. Therefore, the first reliability degree R11 of the peak p corresponding to noise is smaller than the first reliability degree R11 of the peak p corresponding to the measurement target object 10.

The second reliability degree R12(p, m, x, y) (1≤p≤PN, 0≤x<HN, 0≤x<YN) is a reliability degree calculated using the distance value D(a, m−1, x, y) (a=1, 0≤x≤HN, 0≤x<YN)

[Math 2]

$$R11(p, m, x, y) = \sqrt{\sum_{a=1}^{PN} \sum_{X=x-nd1}^{x+nd1} \sum_{Y=y-nd2}^{y+nd2} Q11\{D(a, m, X, Y) - D(p, m, x, y)\} \times Q21(Lumi(a, m, X, Y))^2} \qquad (2)$$

A function Q11(D1−D2) indicated by Expression (4-1) indicates 1 if the distance between a distance value D1 and a distance value D2 is K or less and indicates 0 if the distance is larger than K. For example, K is 2 meters. In another example, K may be K=max(const1×sqrt(D1), const2). Consequently, the first reliability degree R11(p, m, x, y) indicated by Expression (2) indicates a square sum of the distance D(p, m, x, y) of the peak P and a luminance value of the peak "a" in an adjacent region having a distance value equal to or smaller than the distance K.

A function Q21(L) indicated by Expression (2) outputs 0 if L is equal to or smaller than a threshold TH based on information concerning ambient light and outputs L if L is larger than TH. It is possible to exclude, with the function Q21(L), a peak having an S/N larger than a predetermined value.

of the peak "a" of the preceding frame f(m−1) of the peak P in the present frame f(m). As indicated by Expression (3), the second reliability degree R12(p, m, x, y) indicates a square sum of the distance D(p, m, x, y) of the peak P and the luminance value of the peak "a" in the adjacent region having the distance value equal to or smaller than the distance K. By setting a=1, it is possible to suppress a storage amount of the storage circuit 21.

Q'11 is a discrimination function for defining an integration filter (window). The window is determined by a distance D2 of the preceding frame and a change ΔD2 of the distance D2. ΔD2 is a distance difference between the preceding frame and the frame preceding the preceding frame and means a movement of a target. The window is narrower if speed is lower. The influence of ambient light noise is reduced.

[Math 3]

$$R12(p, m, x, y) = \sqrt{\sum_{a=1}^{1} \sum_{X=x-nd1}^{x+nd1} \sum_{Y=y-nd2}^{y+nd2} Q11\{D(a, m-1, X, Y) - D(p, m, x, y)\} \times Q21(Lumi(a, m-1, X, Y))} \qquad (3)$$

[Math 4-1]

$$Q11(D1 - D2): |D1 - D2| < K \qquad (4\text{-}1)$$

[Math 4-2]

$$Q11(D1, D2, \Delta D2): |D1 - D2 - \Delta D2| \le k_p(D1, \Delta D2), k_p(D1, \Delta D2) = k_s(D1) + const \times \Delta D2 \qquad (4\text{-}2)$$

Information concerning ambient light E(m, x, y) (0≤x<HN, 0≤x<YN) may be stored in the storage circuit 21 for each coordinate (x, y) of the present frame f(m) and the preceding frame f(m−1). In this case, in Expression (2), a threshold TH(m, x, y) (0≤x<HN, 0≤x<YN) based on the ambient light E(m, x, y) (0≤x<HN, 0≤x<YN) is used for In Expressions (2), (3), (6), (7), (9), and (10), Q'11 indicated by Expression (4-2) may be used instead of Q11 indicated by Expression (4-1). Q'11 is a discrimination function for defining a search window. The search window is determined by the distance D2 of the preceding frame and the change ΔD2 of the distance D2. ΔD2 is a distance difference between the preceding frame and the frame preceding the preceding frame and means a movement of a target. In Expression (4-2), kp(D1) is, for example, a monotonously increasing function of D1. The search window is narrower if speed is lower. The influence of ambient light noise is reduced.

As it is seen from this, a large number of peaks "a" having equivalent distance values are present in an adjacent region of the preceding frame f(m−1). The second reliability degree R12(p, m, x, y) increases as a luminance value of the peaks "a" increases. The peak p corresponding to the measurement target object 10 has an equivalent distance in the preceding frame f(m−1) as well. Therefore, a larger number of peaks "a" having equivalent distance values occur in the adjacent region. Therefore, the second reliability degree R12 of the peak p corresponding to the measurement target object 10 is larger. On the other hand, the peak p corresponding to noise occurs at random. Therefore, the peaks "a" having the equivalent distance values in the adjacent region decease according to an occurrence probability of noise. Therefore, the second reliability degree R12 of the peak p corresponding to noise is generally smaller than the second reliability degree R12 of the peak p corresponding to the measurement target object 10.

In this way, a larger number of peaks "a" having the equivalent distance values are present in the adjacent regions in the preceding frame f(m−1) and the present frame f(m). The reliability degree R1(p, m, x, y) of the peak p corresponding to the measurement target object 10 further increases as the luminance value of the peaks "a" increases. On the other hand, the peak p corresponding to noise occurs at random. Therefore, the reliability degree R1(p, m, x, y) of the peak p corresponding to noise is generally smaller than the reliability degree R1(p, m, x, y) of the peak p corresponding to the measurement target object 10.

The second reliability degree R2(p, m, x, y) (0≤p<PN, 0≤x<HN, 0≤x<YN) indicated by Expression (5) is different from the first reliability degree R1(p, m, x, y) in that information concerning ambient light is not used. That is, ambient light is not set as a threshold. A value obtained by deleting ambient light luminance from luminance is used. Consequently, the reliability degree R2(p, m, x, y) does not need to retain ambient light information while considering ambient light. Differences from Expression (1) are explained below. The second reliability degree R2(p, m, x, y) is, for example, a square root of an added-up value of the first reliability degree R21(p, m, x, y) indicated by Expression (6) and the second reliability degree R22(p, m, x, y) indicated by Expression (7). Expression (6) is different from Expression (2) in that the function Q2 is not used. Expression (7) is different from Expression (3) in that the function Q2 is not used. That is, in the second reliability degree R2(p, m, x, y), the reliability degree R2(p, m, x, y) is calculated without using information concerning ambient light. Therefore, it is unnecessary to store information concerning ambient light in the storage circuit 21. It is possible to reduce a storage capacity.

[Math 5]

$$R2(p, m, x, y) = \sqrt{R21(p, m, x, y)^2 + R22(p, m, x, y)^2} \quad (5)$$

[Math 6]

$$R21(p, m, x, y) = \sqrt{\sum_{a=1}^{PN} \sum_{X=x-nd1}^{x+nd1} \sum_{Y=y-nd2}^{y+nd2} Q11\{D(a, m, X, Y) - D(p, m, x, y)\} \times (Lumi(a, m, X, Y))^2} \quad (6)$$

[Math 7]

$$R22(p, m, x, y) = \sqrt{\sum_{a=1}^{1} \sum_{X=x-nd1}^{x+nd1} \sum_{Y=y-nd2}^{y+nd2} Q11\{D(a, m-1, X, Y) - D(p, m, x, y)\} \times (Lumi(a, m-1, X, Y))^2} \quad (7)$$

A third reliability degree R3(p, m, x, y) (0≤p<PN, 0≤x<HN, 0≤x<YN) indicated by Expression (8) is different from the second reliability degree R2(p, m, x, y) in that the luminance value Lumi(a, m−1, x, y) (a=1, 0≤x<HN, 0≤x<YN) of the peak "a" of the preceding frame f(m−1) is not used. The difference between Expression (8) and Expression (5) is described below. The third reliability degree R3(p, m, x, y) is calculated by, for example, multiplication of a square root of the first reliability degree R21(p, m, x, y) indicated by Expression (6) and a square root of a numerical value based on the numbers of coupling N1 and N2 indicated by Expression (9) and Expression (10).

[Math 8]

$$R3(p, m, x, y) = \sqrt{R21(p, m, x, y)} \times \sqrt{1 + \frac{N1}{N2}} \quad (8)$$

[Math 9]

$$N1 = \sum_{a=1}^{1} \sum_{X=x-nd1}^{x+nd1} \sum_{Y=y-nd2}^{y+nd2} Q11\{D(a, m-1, X, Y) - D(p, m, x, y)\} \quad (9)$$

[Math 10]

$$N2 = \sum_{a=1}^{PN} \sum_{X=x-nd1}^{x+nd1} \sum_{Y=y-nd2}^{y+nd2} Q11\{D(a, m, X, Y) - D(p, m, x, y)\} \quad (10)$$

N1 indicated by Expression (9) indicates the number of peaks in the preceding frame f(m−1) within an adjacent range having the distance value D(p, m, x, y) of the peak P and the distance value D(a, m−1, x, y) in the distance K. N2 indicated by Expression (10) indicates the number of peaks in the present frame f(m) within an adjacent range having the distance value D(p, m, x, y) of the peak P and the distance value D(a, m, x, y) in the distance K. As it is seen from this, a large number of peaks having equivalent distance values are present in an adjacent region with respect to the peak p. The second reliability degree R21(p, m, x, y) increases as a luminance value of the peaks increases. In this case, the reliability degree R3(p, m, x, y) further increases as the number of N1 increases.

The configuration according to this embodiment is as explained above. An operation example of the distance measuring system 2 according to this embodiment is explained in detail below.

Figure 11:
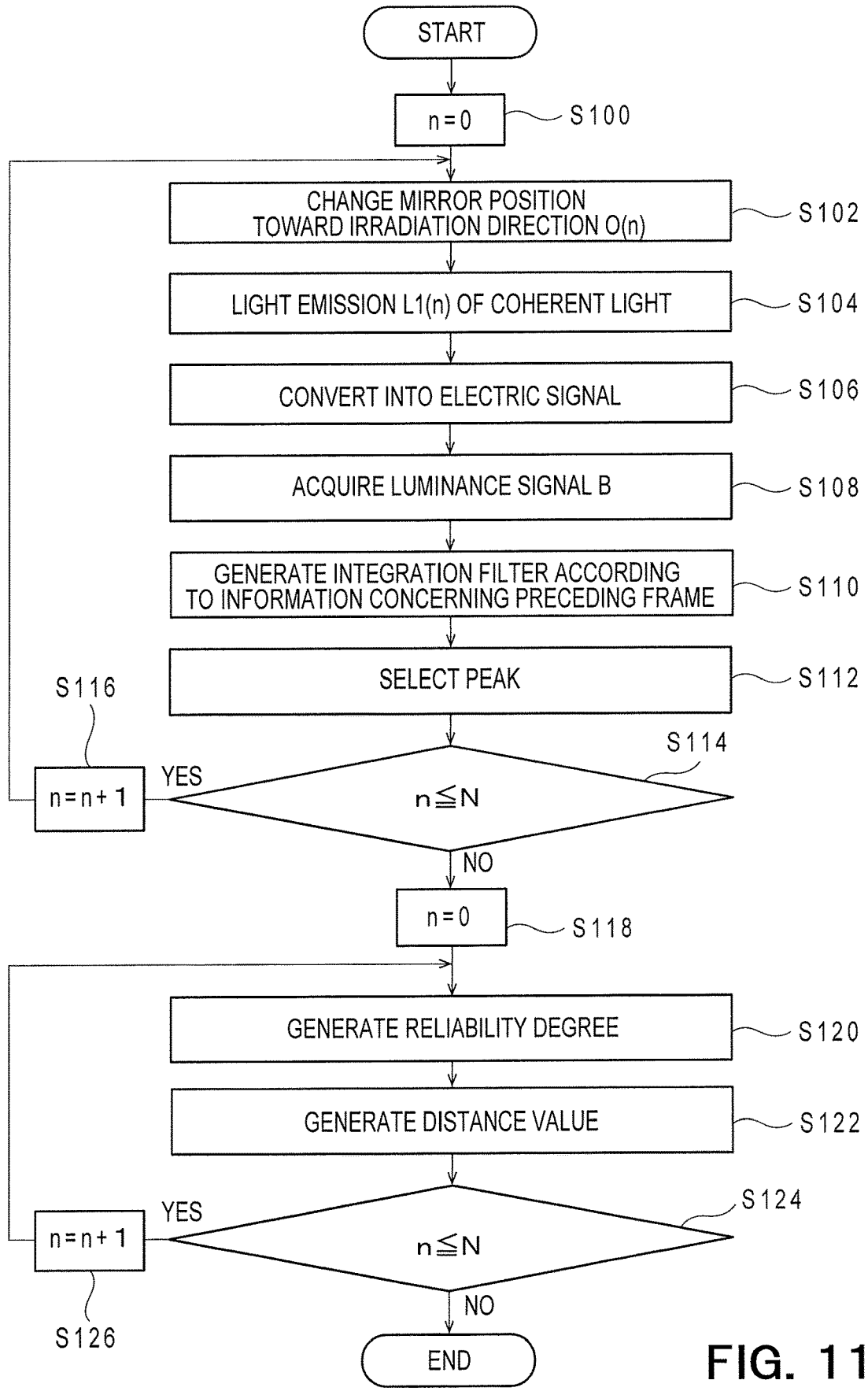
FIG. 11 is a flowchart for explaining a processing operation of a distance measuring system.

FIG. 11 is a flowchart for explaining a processing operation of the distance measuring system 2 according to this embodiment. An overall processing operation in the distance measuring device 5 of the distance measuring system 2 is explained with reference to FIG. 11. In the following explanation, the distance value D(a, m−1, x, y) (a=1, 0≤x≤HN, 0≤x<YN) of the peak "a" of the preceding frame f(m−1) and the luminance value Lumi(a, m−1, x, y) (a=1, 0≤x<HN, 0≤x<YN) corresponding to the distance value D(a, m−1, x, y) and information concerning ambient light are already stored in the storage circuit 21, and measurement of the present frame f(m) is performed.

First, the control circuit 16 in the emitter 100 sets 0 in "n" and controls the second driving circuit 16a to change the position of the mirror 15 toward an irradiation direction O(n) (step 100 and 102).

The control circuit 16 controls the oscillator 11a and the first driving circuit 11b to emit the laser light L1(n) (step 104).

Subsequently, the reflected light L2(n) traveling along the optical axis O2 of the light-receiving optical system is received by the sensor 18 via the mirror 15, the second optical element 14, and the lens 18a and converted into an electric signal (step 106).

Subsequently, the signal generation circuit 20 performs sampling of the electric signal corresponding to the reflected light L2(n). The control circuit 16 causes the storage circuit 21 to store the time-series luminance signal B(m, x, y), the irradiation direction O(n) of which is associated with the coordinate (x, y) (step 108).

Subsequently, the selection circuit 220 acquires, from the storage circuit 21, the adjacent distance of the preceding frame f(m−1) obtained in the adjacent region Ad (FIG. 9) in the coordinate (x, y) and generates an integration filter (window) based on the adjacent distance (step S110). Subsequently, the selection circuit 220 selects a predetermined number of first selection peaks of the time-series luminance signal B(m, x, y) in descending order of peak values and further selects a predetermined second selection peak of the time-series luminance signal B(m, x, y) using the integration filter (window) based on the adjacent distance (step S112). The selection circuit 220 stores, in the storage circuit 21, the distance value D(a, m, x, y) (1≤a≤PN, 0≤x<HN, 0≤x<YN) of the peak "a" and the luminance value Lumi(a, m, x, y) (1≤a≤PN, 0≤x<HN, 0≤x<YN) corresponding to the distance value D(a, m, x, y) and the information E(m, x, y) concerning ambient light.

Subsequently, the control circuit 16 determines whether "n" is equal to or smaller than "N" (step 114). When "n" is equal to or smaller than "N" (YES in step 114), the control circuit 16 adds 1 to "n" (step 116) and repeats the processing from step 102.

On the other hand, when n is larger than N (NO in step S114), the signal processing circuit 22 sets n to 0, acquires a distance value D(a, m, X, Y) (1≤a≤PN, x−nd1≤X<x+nd1, y−nd2≤Y<y+nd2), a luminance value Lumi(a, m, X, Y) (1≤a≤PN, x−nd1≤X<x+nd1, y−nd2≤Y<y+nd2), and ambient information E(m, X, Y) (x−nd1≤X<x+nd1, y−nd2≤Y<y+nd2) and a distance D(a, m−1, X, Y) (a=1, x−nd1≤X<x+nd1, y−nd2≤Y<y+nd2), a luminance value Lumi(a, m−1, X, Y) (a=1, x−nd1≤X<x+nd1, y−nd2≤Y<y+nd2), and ambient information E(m−1, X, Y) (x−nd1≤X<x+nd1, y−nd2≤Y<y+nd2) in a range of an adjacent region in the coordinate (x, y) corresponding to n stored in the storage circuit 21, and calculates a reliability degree R1(p, m, x, y) (0≤p<PN) indicated by Expression (1) (step S120).

Subsequently, the measurement processing circuit 224 generates the distance value Dis(m, x, y) corresponding to a peak pmax indicating the maximum value in the reliability degree R1(p, m, x, y) (0≤p<PN) corresponding to the coordinate (x, y) and the luminance value Lumi(m, x, y) corresponding to the distance value Dis(m, x, y) (step S122).

Subsequently, the signal processing circuit 22 determines whether "n" is equal to or smaller than "N" (step 124). When "n" is equal to or smaller than "N" (YES in step 124), the signal processing circuit 22 adds 1 to "n" (step 126) and repeats the processing from step 120.

On the other hand, when n is larger than N (NO in step S124), the signal processing circuit 22 ends the entire processing.

Figure 12:
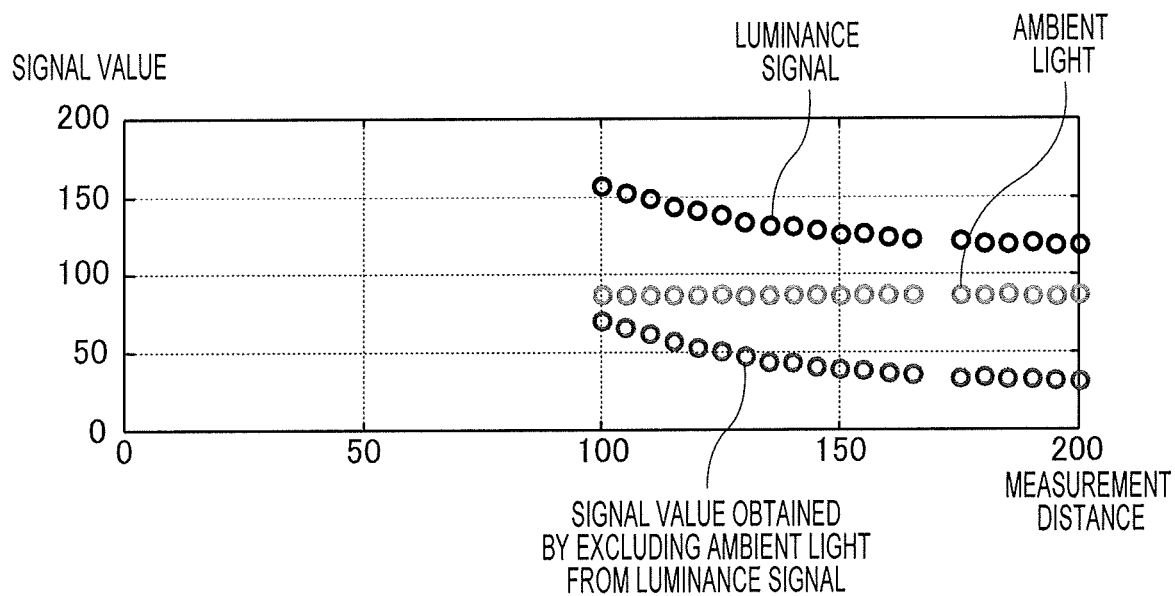
FIG. 12 is a diagram showing a relation between a luminance signal and ambient light used for a simulation.
Figure 13:
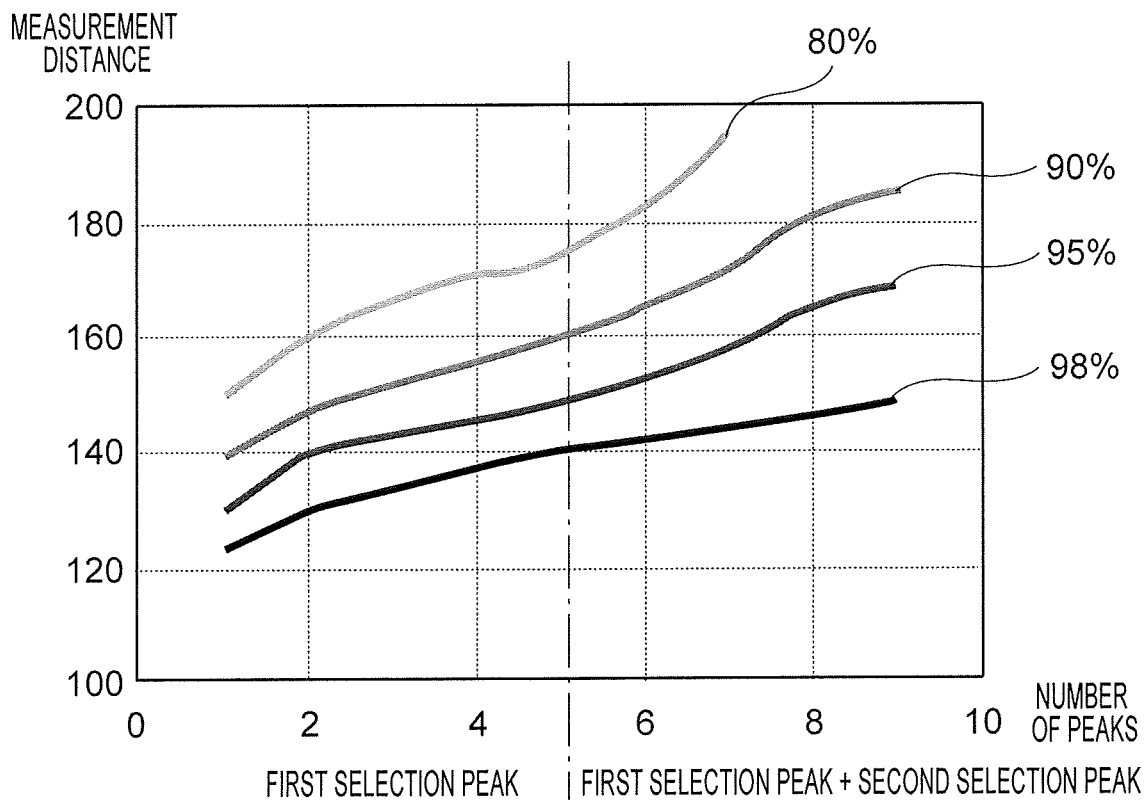
FIG. 13 is a diagram showing a simulation result example of the distance measuring device.

FIG. 12 is a diagram showing a relation between the luminance signal B(m, x, y) and the ambient light E(m, x, y) used for a simulation shown in FIG. 13. In the simulation, the luminance signal B(m, x, y) and the ambient light E(m, x, y) are set to fixed values. On the other hand, a signal value of the luminance signal B(m, x, y) is reduced as a measurement distance increases.

FIG. 13 is a diagram showing a simulation result example of the distance measuring device 5 according to this embodiment. The horizontal axis indicates the number of peaks used for measurement and the vertical axis indicates a measurement distance. Curves indicate measurement distances with respect to an accuracy rate. As shown in FIG. 13, the measurement distance increases in a state in which the accuracy rate is maintained as the number of first selection peaks increases from 1 to 5. From a peak 6, a second selection peak is added to the number 5 of the first selection peaks. As it is seen from this, when the second selection peak is added, the measurement distance further increases in the state in which the accuracy rate is maintained. In this way, when the second selection peak is added, the accuracy rate with respect to the measurement distance further increases. That is, if data of a preceding frame is not used, a result is not improved even if the number of candidates is increased. Rather, the result shows a slightly worsening tendency. This is because a threshold of a reliability degree has to be set stricter in order to realize, for example, denoising of 99%. On the other hand, if the data of the preceding frame is used as explained above, the accuracy rate with respect to the measurement distance further increases.

As explained above, with the distance measuring device 5 according to this embodiment, the selection circuit 220 selects the predetermined number of first selection peaks of the time-series luminance signal B(m, x, y) in the present frame f(m) in order from the peak having the largest peak value and further selects the second selection peak of the luminance signal B(m, x, y) using the information concerning the distance value in the preceding frame f(m−1). Consequently, even when a peak due to reflected light from the measurement target object 10 is not included in the first selection peak, the peak due to the reflected light from the measurement target object 10 can be included in the second selection peak. Therefore, even when noise is predominant, the peak due to the reflected light from the measurement target object 10 can be selected by calculating reliability degrees for the first selection peak and the second selection peak. It is possible to perform distance measurement to the measurement target object 10. The reliabilities may be calculated using results other than the results explained in detail above and techniques such as AI and DNN.

Several embodiments of the present invention are explained above. However, these embodiments are presented as examples and are not intended to limit the scope of the invention. These new embodiments can be carried out in other various forms. Various omissions, substitutions, and changes can be made without departing from the spirit of the invention. These embodiments and the modifications thereof are included in the scope and the gist of the invention and included in the inventions described in the claims and a scope of equivalents of the inventions.

The invention claimed is:

1. A distance measuring device that performs processing on time-series luminance signals of each of frames acquired on the basis of reflected lights of laser lights irradiated sequentially in a plurality of predetermined directions for each of the frames, the distance measuring device comprising:
a storage circuit configured to store information concerning a prior distance value obtained on the basis of a time-series luminance signal of a preceding frame; and
a selection circuit configured to select a first selection peak based on a time-series luminance signal in a present frame and a second selection peak based on the information concerning the prior distance value and the time-series luminance signal in the present frame,
wherein the selection circuit selects the first selection peak without using information concerning the preceding frame.

2. The distance measuring device according to claim 1, wherein
the selection circuit selects the first selection peak and the second selection peak as a predetermined peak of each of the time-series luminance signals in the present frame, and selects the predetermined peaks as a candidate of a distance value, and
the distance measuring device further comprises:
a reliability-degree generation circuit configured to generate a reliability degree corresponding to the predetermined peak selected for each of the time-series luminance signals; and
a measurement processing circuit configured to generate a distance value corresponding to each of the time-series luminance signals in the present frame on the basis of the reliability degree corresponding to the predetermined peak.

3. The distance measuring device according to claim 1, wherein the selection circuit selects, as the first selection peak, a predetermined number of peaks in descending order of peak values for each of the time-series luminance signals of the present frame and further selects a peak based on the prior distance value as the second selection peak.

4. The distance measuring device according to claim 1, wherein the selection circuit acquires, for each of the time-series luminance signals, an adjacent prior distance value based on the laser light of the preceding frame irradiated in a direction within a predetermined range from an irradiation direction of the laser light corresponding to the time-series luminance signal and selects the second selection peak in a range corresponding to the adjacent prior distance value for each of the time-series luminance signals.

5. The distance measuring device according to claim 2, wherein
the selection circuit acquires, for each of the time-series luminance signals, an adjacent prior distance value based on the laser light of the preceding frame irradiated in a direction within a predetermined range from an irradiation direction of the laser light corresponding to the time-series luminance signal, and
the reliability degree is generated on the basis of the adjacent prior distance value included in a distance range corresponding to the predetermined peak for each of the time-series luminance signals.

6. The distance measuring device according to claim 5, wherein the reliability degree is generated on the basis of a value of the time-series luminance signal of a peak corresponding to the adjacent prior distance value included in the distance range.

7. The distance measuring device according to claim 6, wherein
the selection circuit acquires, for each of the time-series luminance signals, a second distance value corresponding to the predetermined peak of each of the time-series luminance signal based on the laser light of the present frame irradiated in a direction within a predetermined range from an irradiation direction of the laser light corresponding to the time-series luminance signal, and
the reliability degree is generated on the basis of the second distance value included in a distance range corresponding to the predetermined peak for each of the time-series luminance signals.

8. The distance measuring device according to claim 7, wherein the reliability degree is generated on the basis of a value of the time-series luminance signal of a peak corresponding to the second distance value included in the distance range.

9. The distance measuring device according to claim 8, wherein, when the value of the time-series luminance signal corresponding to the second distance value is equal to or smaller than a threshold based on ambient light, the time-series luminance signal corresponding to the second distance value is used for the generation of the reliability degree.

10. The distance measuring device according to claim 2, wherein the measurement processing circuit generates, for each of the time-series luminance signals, a distance value corresponding to a peak having a highest value of the reliability degree out of peaks of the time-series luminance signal.

11. The distance measuring device according to claim 2, wherein, when an S/N ratio of the time-series luminance signal of the present frame is equal to or larger than a predetermined value, the selection circuit selects, concerning the time-series luminance signal of the preceding frame, a peak without using the information concerning the prior distance value obtained on the basis of the time-series luminance signal of the preceding frame.

12. The distance measuring device according to claim 1, further comprising:
an emitter configured to irradiate laser lights in order in a plurality of predetermined directions for each of the frames via an optical system; and
a signal generating circuit configured to generate time-series luminance signals of each of the frames acquired on the basis of reflected lights of the laser lights irradiated a plurality of times for each of the frames.

13. A distance measuring method for performing processing on time-series luminance signals of each of frames acquired on the basis of reflected lights of laser lights irradiated sequentially in a plurality of predetermined directions for each of the frames, the distance measuring method comprising:
  storing information concerning a prior distance value obtained on the basis of a time-series luminance signal of a preceding frame; and
  selecting a first selection peak based on a time-series luminance signal in a present frame and a second selection peak based on the information concerning the prior distance value and the time-series luminance signal in the present frame as predetermined peaks,
  wherein selecting the first selection peak includes selecting the first selection peak without using information concerning the preceding frame.

14. The distance measuring method according to claim 13, further comprising:
  generating a reliability degree corresponding to the predetermined peaks selected for each of the time-series luminance signals; and
  generating a distance value corresponding to each of the time-series luminance signals in the present frame on the basis of the reliability degree corresponding to the predetermined peak.

15. The distance measuring method according to claim 13, wherein a predetermined number of peaks are selected as the first selection peak in descending order of peak values for each of the time-series luminance signals of the present frame and a peak is selected based on the prior distance value as the second selection peak.

16. The distance measuring method according to claim 13, wherein, for each of the time-series luminance signals, an adjacent prior distance value based on the laser light of the preceding frame irradiated in a direction within a predetermined range from an irradiation direction of the laser light corresponding to the time-series luminance signal is acquired and the second selection peak is selected in a range corresponding to the adjacent prior distance value for each of the time-series luminance signals.

17. A signal processing method for performing processing on time-series luminance signals of each of frames acquired on the basis of reflected lights of laser lights irradiated sequentially in a plurality of predetermined directions for each of the frames, the signal processing method comprising:
  selecting a first selection peak based on a time-series luminance signal in a present frame and a second selection peak based on information concerning a prior distance value and the time-series luminance signal in the present frame as predetermined peaks;
  generating a reliability degree corresponding to the predetermined peaks selected for each of the time-series luminance signals; and
  generating a distance value corresponding to each of the time-series luminance signals in the present frame on the basis of the reliability degree corresponding to the predetermined peak,
  wherein selecting the first selection peak includes selecting the first selection peak without using information concerning a preceding frame.

18. The distance measuring device according to claim 1, wherein the time-series luminance signal in the present frame is generated by integrating time-series luminance signals in the present frame acquired on the basis of reflected lights of laser lights irradiated in a direction within a predetermined range from an irradiation direction of the laser light corresponding to the time-series luminance signal.

19. The distance measuring device according to claim 1, further comprising:
  a measurement processing circuit configured to generate a distance value in the present frame based on a peak selected from the first selection and second selection peak,
  wherein the peak is more likely to be selected in a case that there are more peaks with equivalent distance values in adjacent regions in the present frame.

20. The distance measuring device according to claim 1, further comprising:
  a measurement processing circuit configured to generate a distance value in the present frame based on a peak selected from the first selection and second selection peak,
  wherein the peak is more likely to be selected in a case that there are more peaks with equivalent distance values in the preceding frame.

* * * * *